(12) United States Patent
Barth et al.

(10) Patent No.: US 7,660,205 B2
(45) Date of Patent: Feb. 9, 2010

(54) METHOD FOR DETERMINING THE DEPTH OF A PARKING SPACE USING ULTRASONIC SENSORS AND ASSOCIATED SYSTEM

(75) Inventors: Harald Barth, Korntal-Muenchingen (DE); Nicolas Jecker, Esslingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 8 days.

(21) Appl. No.: 11/989,641

(22) PCT Filed: Jun. 16, 2006

(86) PCT No.: PCT/EP2006/005770

§ 371 (c)(1),
(2), (4) Date: Jan. 29, 2008

(87) PCT Pub. No.: WO2007/014595

PCT Pub. Date: Feb. 8, 2007

(65) Prior Publication Data

US 2009/0095084 A1      Apr. 16, 2009

(30) Foreign Application Priority Data

Aug. 2, 2005     (DE) ....................... 10 2005 038 524

(51) Int. Cl.
G01S 15/93      (2006.01)
(52) U.S. Cl. ........................................................ 367/99
(58) Field of Classification Search .................. 367/99, 367/909; 340/932.2
See application file for complete search history.

(56) References Cited

U.S. PATENT DOCUMENTS

| 4,845,682 | A | 7/1989 | Boozer et al. |
| 7,492,282 | B2 * | 2/2009 | Danz et al. ................ 340/932.2 |
| 2007/0075875 | A1 * | 4/2007 | Danz et al. ................ 340/932.2 |
| 2009/0095084 | A1 * | 4/2009 | Barth et al. .................... 73/597 |

FOREIGN PATENT DOCUMENTS

| DE | 28 01 333 | 7/1979 |
| DE | 103 23 639 | 12/2004 |
| DE | 103 25 709 | 12/2004 |
| DE | 103 39 645 | 4/2005 |
| EP | 1 296 159 | 3/2003 |
| EP | 1296159 A2 * | 3/2003 |
| WO | WO 2005024463 A1 * | 3/2005 |
| WO | WO 2007014595 A1 * | 2/2007 |

* cited by examiner

*Primary Examiner*—Dan Pihulic
(74) *Attorney, Agent, or Firm*—Paul Vincent

(57) ABSTRACT

A method for determining the depth of a parking space using at least one ultrasonic vehicle sensor. According to the method, the following steps are carried out as the vehicle drives longitudinally past the parking space: a) an ultrasonic wave is emitted, b) echo signals of the emitted ultrasonic wave are collected within a measuring window, c) the dispersion is determined and/or the distribution of the echo signals within that dispersion is determined, d) a depth is defined if the dispersion range of all and/or several echo signals that form a concentration within the distribution lies below a pre-determinable threshold value.

7 Claims, 2 Drawing Sheets

METHOD FOR DETERMINING THE DEPTH OF A PARKING SPACE USING ULTRASONIC SENSORS AND ASSOCIATED SYSTEM

This application is the national stage of PCT/EP2006/005570 filed on Jun. 16, 2006 and also claims Paris Convention priority to DE 10 2005 038 524.9 filed Aug. 02, 2005.

The invention relates to a method for determining the depth of a parking space using ultrasonic vehicle sensors. The depth of a parking space must be determined to ascertain whether the parking space contains objects that would cause a collision during parking. Further, to determine the depth of a parking space, the curb stone is usually detected by the ultrasonic sensors and used as a reference line. Parking the vehicle in the space may result in the rear or front of the vehicle overhanging the curb stone. This is generally no problem because a curb stone is usually low enough to avoid collision with the overhanging part of the vehicle. However, if a higher object, such as a wall, delimits the depth of the parking space, this may result in a collision or to abandonment of the parking maneuver.

Prior art discloses systems with which the height of an object limiting the depth can be detected. For example, DE 101 46 712 A1 discloses two sensors which may be mutually offset by 90°. One sensor is used to detect the height of objects and the other sensor samples in the vertical direction. Further, sensors are known from prior art that can be mechanically adjusted to determine the height of objects (EP 0 904 522 A1 or DE 103 22 601).

The known systems and methods have the disadvantage that they are comparatively complex. They either use multiple sensors with associated additional costs or a mechanical system is required to pivot the sensors.

The object of this invention is to provide a method for determining the depth of a parking space using ultrasonic sensors that provides reliable information in a simple manner. In particular, the depth that can result in a collision of the vehicle because the rear or front of the vehicle overhangs the curb stone when parking will be detected.

SUMMARY OF THE INVENTION

This objective is achieved by an inventive method that is characterized by the following steps:
a) an ultrasonic wave is emitted
b) echo signals of the emitted ultrasonic wave are collected within a measuring window
c) the dispersion and/or the distribution of the echo signals within said dispersion is determined
d) a depth is defined if the dispersion range of all and/or of several echo signals that form a concentration within the distribution lies below a predeterminable threshold value.

Based on the comparison of the dispersion range of all and/or of several echo signals, in particular, echo signals that form a concentration, it can be determined whether an object is limiting the depth of the parking space. For example, if the parking space is limited by a wall, all echo signals may be reflected on the wall, so that the dispersion range of all signals is very small and is below the threshold value. Moreover, the emitted ultrasonic wave may be reflected not only on the wall but also on the road surface in front of the wall or a painted marking on the road. For example, if the painted marking extends in the longitudinal direction, analysis of all the echo signals will reveal a broader dispersion range. But if the distribution of the echo signals within the dispersion is considered, a signal concentration within the dispersion can be determined from several echo signals reflected on the wall, whose dispersion range is below the threshold value. In this case as well, the depth of the parking space can be detected.

The inventive method has the advantage that one sensor suffices and no mechanical system is required to determine the depth of a parking space.

According to the invention, the dispersion of the echo signals and their distribution in terms of the propagation times of the echo signals and/or in terms of the spatial distance of the objects reflecting the echo signals can be considered. The spatial distance from the sensor and/or from the vehicle can be determined, in particular, by measuring the propagation times of the collected echo signals resulting from the emitted ultrasonic waves.

The threshold value, below which a depth is detected, can, in terms of propagation time, be 4 msec, and in particular 3.2 msec, and in particular 2 msec. Under normal circumstances, a propagation time offset of the echo signals of 64 µsec corresponds to a spatial distance of the object from the vehicle of about 1 cm. A time offset of the echo signals below 4 msec then corresponds to a spatial distance of about 62.5 cm; 3.2 msec corresponds to about 50 cm, and 2 msec corresponds to about 31.25 cm. In terms of spatial distances, a depth limit may exist if the dispersion range of several or all spatial distances is below 65 cm, and in particular below 50 cm, and in particular below 30 cm. In practical trials, a threshold value of about 50 cm has proven advantageous.

According to the invention, echo signals of the emitted ultrasonic wave are advantageously collected 3 times to 20 times, and in particular 4 times to 8 times in a measuring window in which an ultrasonic wave is emitted. According to the invention, the dispersion range of the propagation times of the echo signals and/or spatial distances of the objects causing the echo signals can then be determined by means of the echo signals collected 4 times to 8 times. If, in particular, the echo signals last received lie within a narrow dispersion range, it can be assumed that there is an interfering depth limit.

According to the invention, the individual steps are advantageously performed over the entire length of the parking space or over a section thereof while passing the parking space. In this way, the depth limit can be determined over the corresponding length of the parking space.

According to a further advantageous embodiment of the invention, the ultrasonic waves are emitted largely conically with a semi-apex angle of 10° to 30° and, in particular, about 20°. The apex angle of the cone is then twice the value of the semi-apex angle. Because emission of the signals is conical, time-offset echo signals are even obtained if the ultrasonic wave strikes a wall that delimits the parking space and is flat and parallel to the longitudinal axis of the parking space.

The invention also relates to a system for determining the depth of a parking space that works according to the inventive method and comprises at least one ultrasonic sensor and associated signal processing for determining the dispersion range of the propagation times of the echo signals and/or the dispersion range of the spatial distances of the objects causing the echo signals.

Details and advantageous embodiments of the invention are contained in the following description in which the invention is described and explained in more detail using the embodiment shown in the drawing.

DESCRIPTION OF THE PREFERRED EMBODIMENT

Figure 1:
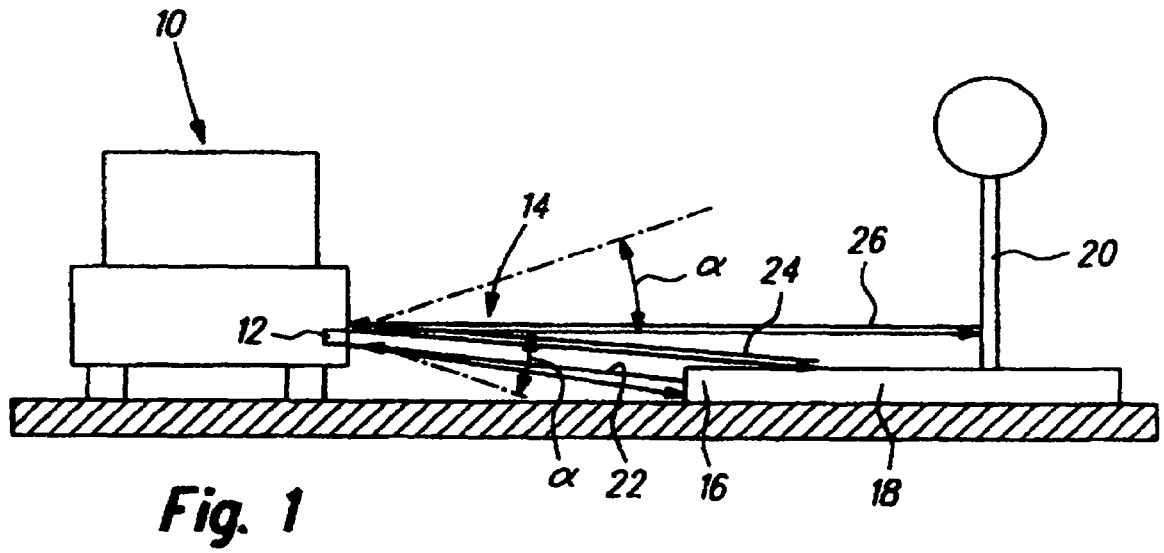
FIG. 1 Rear view of a vehicle passing a parking space.

FIG. 1 shows a vehicle 10 comprising an ultrasonic sensor 12 mounted on the side. To the side of the vehicle, there is a parking space 14 that is limited by a curb stone 16. A sidewalk 18 joins on to the curb stone 16, on which there is an object 20.

With the ultrasonic sensor 12, a cone-shaped ultrasonic wave is emitted that exhibits a semi-apex angle α of approximately 20°. An ultrasonic wave is emitted in a measuring window whose echo signals are collected 4 times to 8 times. FIG. 1, shows by way of example, three echo signals 22, 24 and 26 that result from an emitted ultrasonic wave. The first echo signal 22 is reflected on curb stone 16. The second echo signal 24 is reflected on sidewalk 18, and the third echo signal 26 on the object 20.

Figure 2:
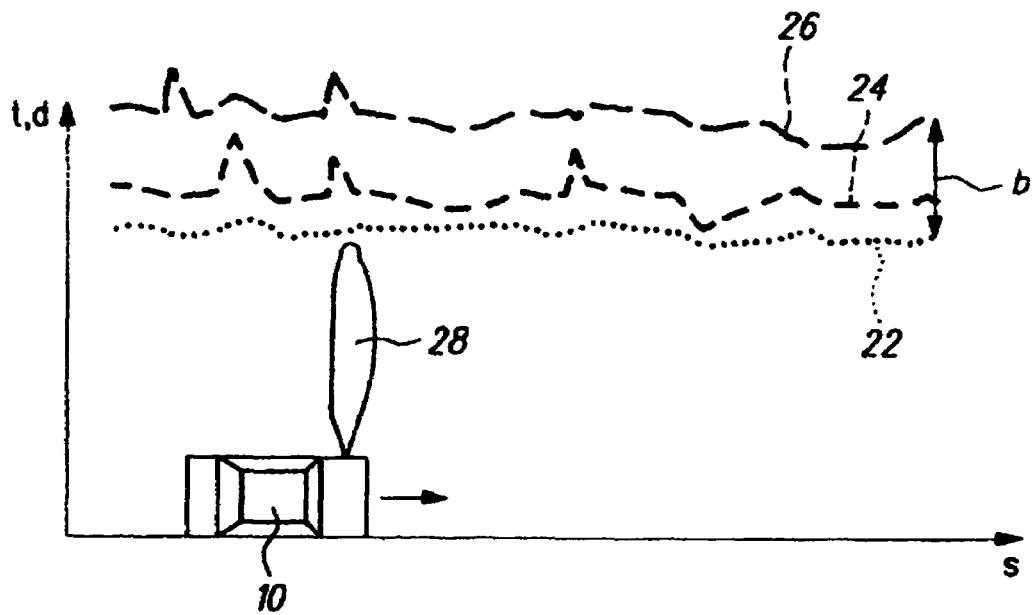
FIG. 2 Plan view of the vehicle according to FIG. 1 with schematically represented echo signals.

FIG. 2 plots the propagation times t of the received echo signals 22, 24, 26 versus the distance s covered by the vehicle 10. Instead of the propagation times t, it is also possible according to the invention to plot the distances d of the objects from which the echo signals 22, 24, 26 are reflected, which are a linear function of the propagation time, versus the distance s traveled by the vehicle. FIG. 2 also indicates the sensing range 28 of the ultrasonic sensor 12.

As is illustrated in FIG. 2, the dispersion range b of the time offset of the collected echo signals 22, 24, 26 is comparatively large. A parking space depth 14 to be detected exists if the dispersion range b is below a predeterminable threshold value W. In practice, it has been shown that a depth of the parking space 14 can be assumed if the threshold value W is approximately 3.2 msec. For evaluation of the echo signals with respect to the distance of the spatial objects, a depth is found if the dispersion range b of the spatial distances of the objects causing the echo signals is less than or equal to 50 cm.

In the situation depicted in FIGS. 1 and 2, the dispersion range b in terms of the time offset of the echo signals is greater than 3.2 msec and, in terms of the distances of the objects, it is greater than 50 cm. On this basis, determining the dispersion range can reveal that there is no depth of the parking space 14 that would result in a collision if the rear or the front were to overhang the curb stone on parking.

According to FIG. 2, the dispersion range b is considered over the entire parking space. Because the dispersion range b is largely equal over the entire length of the parking space, it can be assumed that there is no limiting depth over the length of the parking space.

Figure 3:
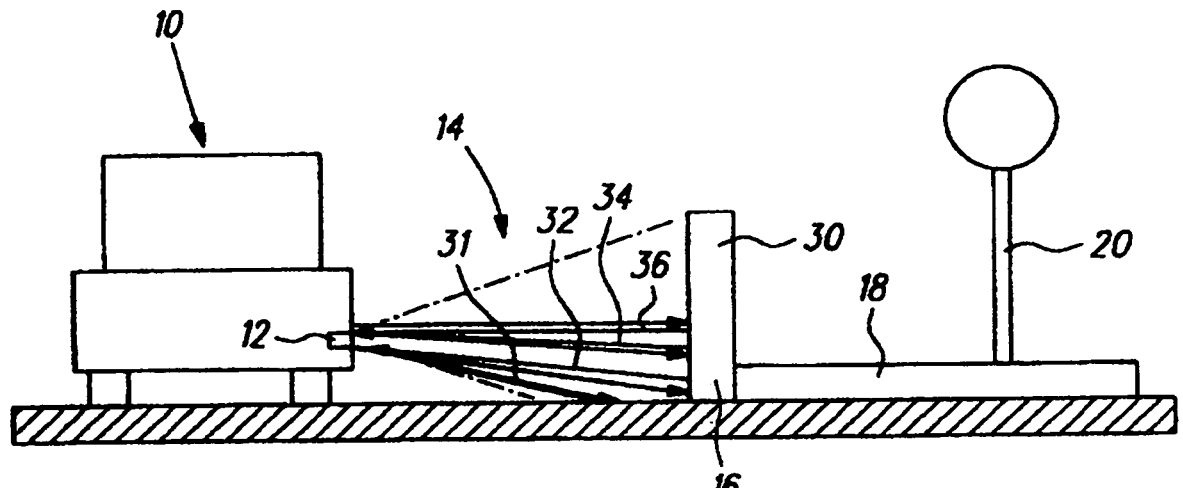
FIG. 3 A view corresponding to FIG. 1 with a wall limiting the parking space.

FIG. 3 differs from FIG. 1 in that a wall 30 extending vertically exists in the region of the curb stone 16.

Figure 4:
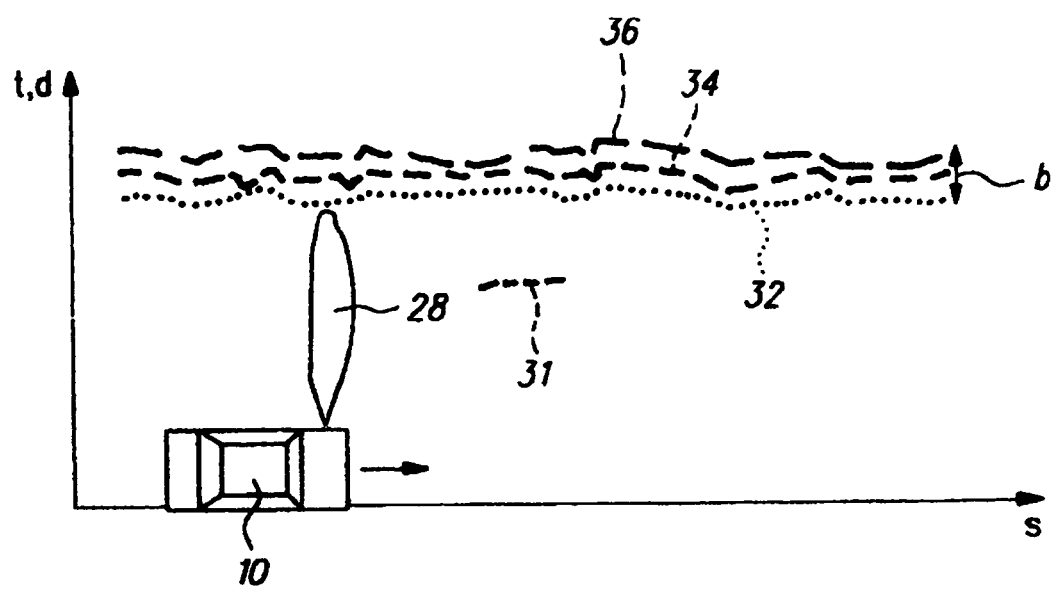
FIG. 4 Plan view onto FIG. 3 with schematically represented echo signals.

Analogously with FIG. 1, FIG. 3 shows three echo signals 32, 34, 36 as examples that are collected within a measuring window. In addition to the echo signals 32, 34, 36 occurring due to the longitudinal extension of the wall over the length of the parking space, a further echo signal 31 may occur briefly that is reflected on the road surface. This signal, however, does not occur over the length of the parking space but only as a local interference signal, as is indicated in FIG. 4. Such locally occurring signals can be suppressed and are then not considered in the inventive method.

The dispersion range b resulting from echo signals 32, 34, 36 according to FIG. 4 is comparatively small because the propagation times of echo signals 32, 34, 36 are almost equal due to the presence of the wall running nearly parallel to the longitudinal axis of the parking space 14. The depth of the parking space 14 limited by the wall is detected because of the small dispersion range b, which is below 3.2 msec in terms of time and below 50 cm in terms of distance. The wall 30 extends over the entire parking space 14 passed longitudinally by the vehicle, as can be seen from the signals 32, 34, 36 which are nearly co-linear in FIG. 4.

According to the invention, one can therefore qualitatively distinguish whether a parking space depth obstructing the parking maneuver exists. If such a limiting depth exists, the parking maneuver can be executed to avoid the front and/or rear of the vehicle overhanging the curb stone, so that no collision of the vehicle with the detected object occurs.

The invention has the advantage that no additional sensors and/or additional mechanisms are required for the sensor 12. Based solely on signal processing, that is, appropriate software, it can be ascertained whether or not the parking space depth is limited.

We claim:

1. A method for determining a depth of a parking space using at least one ultrasonic vehicle sensor of a vehicle, the method comprising the following steps:
    a) passing the vehicle by the parking space in a longitudinal direction;
    b) irradiating ultrasonic waves towards the parking space;
    c) detecting echo signals of the irradiated ultrasonic waves reflected from the parking space;
    d) analyzing the echo signals detected in step c) to determine propagation times of the echo signals and/or spatial distances of objects reflecting the echo signals;
    e) determining a dispersion and/or distribution of the propagation times and/or spatial distances extracted in step d); and
    f) defining a depth of the parking space if a dispersion range of all and/or of several propagation times and/or spatial distances that form a concentration within the distribution lies below a threshold value.

2. The method of claim 1, wherein the threshold value, in terms of propagation times of the echo signals, is 4 msec, 3.2 msec or 2 msec.

3. The method of claim 1, wherein the threshold value, with respect to spatial distances of objects reflecting the echo signals, is 65 cm, 50 cm or 30 cm.

4. The method of claim 1, wherein echo signals of an emitted ultrasonic wave are collected in a measuring window 3 times to 20 times.

5. The method of claim 1, wherein a dispersion range for determining the depth over an entire length of the parking space or over a section of the parking space is considered while passing the parking space.

6. The method of claim 1, wherein the ultrasonic wave is largely emitted conically with a semi-apex angle of 10 to 30°.

7. A system for determining a depth of a parking space using the method of claim 1 and comprising at least one ultrasonic sensor and signal processor.

* * * * *